3,120,499
AIR-DRY SURFACE COATING RESIN
Ronald L. Broadhead, Park Forest, Ill., assignor to Standard Oil Company, Chicago, Ill., a corporation of Indiana
No Drawing. Filed Apr. 12, 1960, Ser. No. 21,587
9 Claims. (Cl. 260—22)

This invention relates to resins of the polyester condensation reaction type and particularly resins which are suitable for the formation of an air-dry surface coating film, and preferably, resins which have substantial solubility in water.

Resins have been used for a long time in the production of surface coating films. The so-called alkyd resins which are extensively used for production of surface coatings possess reasonable air-dry properties at ordinary atmospheric temperatures. The term air-dry means the ability of the resin to form a rigid solid film when exposed to the atmosphere at ordinary temperatures, particularly 50°–100° F. These alkyd resins are soluble in hydrocarbon solvents.

Extensive efforts have been made to produce materials suitable for surface coating application which materials can use water as the vehicle. At present, air-dry surface coatings are producible only by the use of true emulsions or latex emulsions when water is the vehicle. For reasons of flexibility in formulation and storage stability, a truly water soluble surface coating system is of very great interest to the paint industry.

A resin suitable for the formation of an air-dry surface coating film has been discovered which resin is soluble in the ordinary hydrocarbon solvents and oxygenated organic solvents now used in the paint industry and is also capable of forming very stable emulsions with water as the paint vehicle. A truly water soluble resin suitable for the formation of an air-dry surface coating film has been discovered; this water soluble resin is the reaction product of the organic solvent soluble resin and a hereinafter defined amine or ammonia.

The air-dry properties of the resins of the invention are to be understood as indicating that when a surface coating film—for example, 1 mil thick—is formed from organic solvent solution or water solution or water emulsion, the film will harden and form a solid structure such as afforded by present air-dry paints. The time needed to form a tack-free film will vary with the particular resin, the temperature to which the film is exposed, and the presence or absence of driers. The presence of cobalt driers such as normally utilized in the paint industry permits the formation of hard tack-free films in periods of time permitting use on exterior and interior surfaces.

RESIN

The organic solvent soluble resin of the invention consists essentially of the polycondensation reaction product of a benzene tricarboxylic acid capable of forming an anhydride, polyalkylene glycol monoalkyl ether, a monoglyceride type product of a poly unsaturated fatty acid and glycerol or an erythritol or an alcoholysis product of drying fatty oils with glycerol or an erythritol which alcoholysis product corresponds on the average to a monoglyceride type compound. Also, the resin can be prepared by utilizing a poly unsaturated fatty alcohol in addition to the monoglyceride or alcoholysis product.

The benzene tricarboxylic acid reactant is capable of forming an anhydride. The acidic member present in the polycondensation zone may be trimellitic acid, trimellitic anhydride, hemimellitic acid and/or hemimellitic anhydride. For convenience, hereinafter the amounts of the various reactants charged to the polycondensation zone will be given in mole ratios with respect to the acidic member charged to that zone.

The acidic member is reacted with polyalkylene glycol monoalkyl ether. This ether contains from 2 to 8 ether groups; each alkylene unit present in the ether contains from 2 to 3 carbon atoms, i.e., the alkylene units are either ethylene or propylene; the alkyl group present in the ether contains from 1 to 8 carbon atoms. Numerous species of the defined ethers are available commercially under the "Carbitol" trade name. Specifically, the defined ethers are known as alkyl Carbitols. The Carbitols are alkylation reaction products of ether glycols and alkanols. Illustrative ether glycols are diethylene glycol, triethylene glycol, tetraethylene glycol, and polyethylene glycols containing not more than 8 ether linkages; dipropylene glycol, tripropylene glycol, and polypropylene glycols containing not more than 8 ether linkages. Illustrative alkanols are methanol, ethanol, isopropanol, n-butanol, t-butyl alcohol, and octanol. The mixtures of isomeric alkanols prepared by the Oxo process are particularly suitable, especially isooctyl alcohol. Illustrative of the nomenclature utilized herein is the alkylation product of diethylene glycol with ethanol which product is known as diethylene glycol monoethyl ether or 2-(2-ethoxyethoxy)ethanol or ethyl Carbitol.

The acidic member and the ether are present in the polycondensation zone in the respective mole ratio of 1:0.3–0.7. In other words, 0.3–0.7 mole of the defined ether are charged to the condensation zone for each mole of acidic member therein.

The ester of the defined acidic member and the defined ether (and hereinafter defined fatty alcohol) is condensed in a polyesterification condensation reaction with a material affording two hydroxyl groups per molecule. It will be evident from the following disclosure that this hydroxyl group affording material will provide two hydroxyl groups per molecule only as an average of the molecules in the material. When this material is an alcoholysis product, there may be on the average somewhat more than two hydroxyl groups per molecule; it is intended that this material in effect functions as a dihydric alcohol.

The dihydroxyl group affording material may be an ester of a polyethenoid fatty acid containing at least about 10 carbon atoms and a polyhydric paraffinic alcohol (alkane polyol) containing 3–4 hydroxyl groups. The polyhydric alcohols include glycerol, erythritol, pentaerythritol, threitol, dipentaerythritol, and trimethylol propane. The polyethenoid fatty acid contains at least two olefinic bonds and contains at least about 10 carbon atoms. The fatty acids containing 16–24 carbon atoms are particularly suitable. Illustrative fatty acids are: linoleic, hiragonic, elestearic, moroctic, arachidonic, clupanodonic, and nisinic. An economical and preferred source of acids are the natural mixtures of acids obtained from drying fatty oils such as linseed oil, soya oil, tung oil, etc. When the defined polyol is glycerol, the ester charged to the reaction zone is properly termed a monoglyceride of the particular fatty acid. For convenience, the terminology monoglyceride is utilized to describe this ester even when the polyol utilized in the formation of the ester is some other three or four hydroxyl group containing polyol.

Instead of more or less pure monoglyceride the dihydroxyl group affording material may be the alcoholysis product of the hereinabove defined polyol and a drying fatty oil. When the polyol used in the alcoholysis reaction is glycerol, then the alcoholysis product will be a monoglyceride of the polyethenoid fatty acids contained in the drying oil and also of the other fatty acids contained in the drying oil and non-reactive materials. When the reacting polyol is other than glycerol, the alcoholysis product will be a mixture of true glycerides and glyceride-type esters of the various acids and the reacting polyol. Sufficient reacting polyols is utilized in the alcoholysis reaction to have in the alcoholysis product compounds affording on the average two hydroxyl groups per molecule.

Any of the drying oils containing polyethenoid fatty acid esters, whether of vegetable or marine life origin, may be utilized. Illustrative of these drying oils are: linseed, soybean, tung, castor, dehydrated castor, oiticica, perilla, safflower, menhaden, and sardine.

When special properties are desired, the dihydroxyl group affording material may be a mixture of one or more of the various monoglycerides or a mixture of monoglyceride with an alcoholysis product or a mixture of alcoholysis product from two or more fatty oils, etc.

Particularly suitable air-drying resins are obtained when utilizing monoglycerides of linseed oil fatty acids, the alcoholysis product of linseed oil fatty acids with either glycerol or pentaerythritol, the monoglycerides of tung oil fatty acids and the alcoholysis product of tung oil with pentaerythritol.

The defined dihydroxyl group affording material is charged to the condensation zone in a mole ratio to acidic member charged therein of 1.6–2.3:1. In other words, for each mole of acidic member charged, from about 1.6 to 2.3 moles of the defined material are charged.

An air-dry resin can be obtained by reacting the ester product of the defined acidic member and defined ether with a polyethenoid fatty alcohol containing at least 6 carbon atoms or an ester product of simultaneously reacting the acidic member, the ether, and the fatty alcohol with the hereinabove defined dihydroxyl group affording materials. The polyethenoid fatty alcohol contains at least two olefinic bonds and at least 6 carbon atoms. The fatty alcohols containing from 16 to 24 carbon atoms are particularly suitable. In addition to pure fatty alcohols, the fatty alcohols derived by the controlled hydrogenolysis of drying fatty oils may be used and, indeed, are the preferred sources of fatty alcohol. The fatty alcohol is charged to the reaction zone in a mole ratio of acidic member to fatty alcohol of 1:0.7–0.3. The relative amounts of ether and fatty alcohol charged to the reaction zone with respect to the acidic member charged is controlled at about 1:1, i.e., it is desired that the ester product be essentially a monoester of the acidic member.

The ester product containing the fatty alcohol is then condensed with the hereinabove defined dihydroxyl group affording materials in the same manner and in the same ratios as when no fatty alcohol was used.

The polycondensation product resin is a material characterized by an acid number of about 15–60 (acid number is the mg. KOH per gram of resin). Also, this resin is characterized by air-drying properties when exposed to the atmosphere at ordinary temperatures in the form of a surface coating film.

The ester preparation reaction is carried out by intermingling the acidic member and the ether (and the fatty alcohol) at a temperature on the order of 80°–130° C. until all of the acidic member has passed into solution, i.e., reacted. When the fatty alcohol ester is desired, the acidic member and the ether may be reacted under these temperature conditions and then the fatty alcohol added and the reaction continued until the alcohol has passed into solution, i.e., reacted. The reaction is carried out utilizing a reflux system permitting trapping out of the water formed in the reaction.

The polycondensation reaction is carried out in the usual manner. The reaction herein has usually been carried out in a vessel provided with a condensing system permitting trapping out of water of reaction. The reactants are agitated at a temperature of about 160° C. to about 200° C., more usually about 180° C. The reaction is continued until the desired acid number is reached or to the point where the viscosity increase of the contents of the reaction zone indicate that the gelation point is being approached.

The resin, which is a translucent material of color ranging from clear to tan dependent upon the reactants, is controlled to an acid number from about 15 to about 60. This resin is extremely soluble in the hydrocarbon solvents and oxygenated organic solvents commonly used in the surface coating field. The better known of these solvents are methyl alcohol, ethyl alcohol, butyl alcohol, acetone, methylethyl ketone, Cellosolve, benzene, toluene, xylene, and also in mixed solvents such as 60:40 volume ratio of xylenes and butyl alcohol. Also, the resin is distinguished by its property of forming relatively stable dispersions (emulsions) in water; these emulsions may readily be formed by agitating the resin and water at a moderately elevated temperature such as 150° F. (65° C.).

The resin may be utilized in its organic solvent solution or water emulsion to form air-dry surface coatings. Preferably, the solutions contain a cobalt and/or lead drier to speed up the drying reaction. The various cobalt and lead driers in the paint industry are suitable for this purpose. In addition, the solutions may contain pigments such as titanium dioxide and color imparting bodies permitting the lay down of a film of the paint type.

Even though the solvent soluble resin and water emulsion forms are particularly useful in the surface coating field, it is preferred that the resin be converted to a water soluble form permitting the use of water as the vehicle for a true water solvent surface coating affording composition.

WATER SOLUBLE RESIN

The water soluble resin consists of the resin produced by the reaction of the polylcondensation reaction and an alkaline reacting agent. The resin and the agent are reacted until a water soluble resin is obtained. Usually enough agent is used to neutralize the acidity of the resin; less may be used. The amount of alkaline reacting material is most readily determined by following the pH of the aqueous medium. The resin passes into solution substantially completely at a pH of about 5. In practically all instances, the resin will be in a complete solution at a pH of about 6. The use of alkaline agent in excess of that needed to bring all the polyester product into solution is not harmful, at least up to a water solution pH of about 8. It is preferred to have the aqueous solution somewhat on the acid side or neutral, i.e., a pH of from 6 to 7.

The alkaline reacting agent may be ammonia or alkylamine, or heteroamine or an alkanolamine. Ammonium hydroxide as the aqueous solution containing 20–28% is suitable. The alkyl amines, particularly the lower molecular weight containing not more than 4 carbon atoms in each alkyl group, are suitable. The alkanolamines, such as 2-amino-2-methyl-1-propanol ethanolamine and dimethylethanolamine, are especially suitable. The heteroamines, such as morpholine, pyridine, and piperdine may be used. The type of alkaline reacting material used is determined in part by the characteristics desired in the final water soluble resin; also, by the type of resin product which is to be converted to a water soluble form.

The neutralization reaction is carried out by contacting the resin and the aqueous alkaline reacting medium. It is preferred that it be warm, i.e., maintained in the region of 100–160° F. The two are agitated until the resin has passed into solution. The water solutions of the water soluble resin are clear liquids usually containing some opalescent appearance; the solutions may be colorless or colored, depending on the particular water soluble resin present.

The water soluble resin behaves in essentially the same manner as the resin when exposed to oxygen or air in that an air-dry solid is formed. These water soluble resins produce solutions containing as much or more than 50 percent by weight of the resin. (The water soluble resins are also soluble in the ordinary oxygenated organic solvents, as well as in mixtures of these solvents with benzene hydrocarbons.)

When a paint composition is to be formed, the resin, the alkaline agent, the water vehicle and pigments may be intermingled simultaneously to obtain the water solvent system in one operation.

IMPROVED AIR-DRY RESIN

It has been discovered that a resin, either organic solvent soluble or water soluble, of improved air-dry properties is obtained by heating the resin with a cobalt salt of a fatty acid. For convenience, it is customary to heat an organic solvent soluble resin with the cobalt salt at a temperature on the order of 130°–220° C. The resin and the cobalt salt are held at this temperature for time such that the air-dry properties of a film formed from the resin is improved relative to the resin which has not been cobalt treated. The times will vary with the particular cobalt salt, the particular resin, and the temperature of reaction of the two. The minimum times may vary from 5 minutes to as much as 60 minutes.

The cobalt may be reacted with any of the fatty acids; the hydrate forms may be used. Cobaltous acetate and cobaltous acetate tetrahydrate are preferred cobalt salts. The amount of cobalt salt utilized will depend upon the particular resin and the air-dry characteristics desired in the final treated resin. In general, the salt is charged to the reaction zone in an amount of 0.05–0.5 weight percent, calculated as a cobalt metal, and based on the resin charged.

While all resins are improved with respect to the air-drying properties, by this treatment the resins containing fatty alcohols are especially responsive to and benefit by this treatment with the cobalt salt.

In many instances, sufficient cobalt metal is present in the resin as a result of this treatment that additional cobalt drier is not needed in the final paint formulation. In any event, the cobalt metal present in the resin may be considered as part of the total cobalt or cobalt and lead drier requirement of the final paint formulation.

ILLUSTRATIONS

Typical resins of the invention are set out hereinbelow. Also, paint compositions prepared from these resins using water as the vehicle have been prepared and the air-dry property of films produced therefrom are set out.

Example 1

61.5 grams trimellitic anhydride (0.32 mole), 26.0 grams butyl carbitol (0.16 mole) and 42.6 grams linseed fatty alcohol (0.16 mole) were heated together for 75 minutes at 103–120° C. 124 grams of linseed oil monoglycerides (0.35 mole) were then added. The charge temperature was raised to 170° C. in 25 minutes and held at 170°–175° C. for 15 hours to give a fluid brown resin with an acid number of 52.8.

20.0 grams of the resin were dissolved in a solution of 1.68 grams of 2-amino-2-methyl-1-propanol in 80 ml. of distilled water. This was just sufficient amine to neutralize the acidity of the resin. 1.66 grams of cobalt naphthenate containing 6% cobalt was added followed by 18.0 grams of titanium dioxide. The mixture was stirred for 10 minutes and applied as a paint. The coating dried overnight (from 4:00 p.m.). The film was both tack-free and through dried. After 24 hours, it was not noticeably attacked when rubbed with the forefinger vigorously in the presence of water. After 30 days drying it was not attacked by 1% aqueous "Tide" even after 30 minutes exposure.

Example 2

A resin was prepared by reacting 96.03 grams (0.50 mole) of trimellitic anhydride with 0.25 mole butyl carbitol and 0.25 mole linseed oil monoglycerides at 110–120° C. Subsequently (after 90 minutes) 195.3 grams (0.55 mole) of linseed monoglycerides were added and the temperature was raised to 170° C. and held at 170–175° C. until the acid number of the charge was 56.1. The resin was filtered.

100 grams of this resin was heated with 0.42 gram cobalt acetate tetrahydrate (0.098% cobalt based on the resin) for 20 minutes at 170–200° C. The 200° C. temperature level was held for 2 minutes at the middle of the heating cycle.

Sample of this cobalt treated resin and the untreated resin were converted to paints. Paint A was prepared from the untreated resin. Paints B and C were prepared from the cobalt treated resin. In each instance, 30 g. of resin, 100 ml. of water, 2.4 g. of 2-amino-2-methyl-1-propanol and 27 g. of titanium dioxide were used in forming the paint composition. Paint A contained 2.5 g. of cobalt naphthenate drier (0.50% cobalt). Paint B contained only the cobalt from the treating. Paint C contained 2.5 g. of additional cobalt drier (0.50% cobalt).

The paints were applied to redwood panels—no primer coat. The film from paint A was tacky (untreated resin; cobalt drier) after 18 hours exposure at a temperature of about 75° F. (24° C.). A first coat of paint B (treated resin; no cobalt drier) was tack-free in 2 hours and dried throughout in 24 hours; a second coat was tack-free in 2 hours and dried throughout in 18 hours. A first coat of paint C (treated resin; additional cobalt drier) was tack-free in 2 hours and dried throughout in 18 hours; a second coat. The film from paint A was tacky (untreated resin; hours.

Example 3

These formulations demonstrate clearly the versatility of these water soluble resins for formulating counterparts for any of usual types of solvent paints ordinarily marketed. They show that any measure of gloss can be obtained depending on the formulation. (This is not true of the water-based latex and emulsion paints which do not give any appreciable amount of gloss.)

These formulations were all derived from the following base resin.

81.0 gram of butyl carbitol (0.50 mole) and 133.7 grams of linseed fatty alcohols (0.50 mole) were heated together with 192.06 grams of trimellitic anhydride (in a glass resin kettle fitted with thermometer, stirrer, reflux condenser connected through a Dean-Stark trap and a nitrogen inlet tube) for 90 minutes at 100–122° C. 390.0 grams of linseed monoglycerides (1.10 mole) were added and the charge temperature was raised to 170° C. in 30 minutes. The charge was held at 170–183° C. for 4.5 hours and then dumped. Acid number of the clear viscous fluid resin—46.6.

A. EXTERIOR HOUSE PAINT FORMULATION 50.0 grams of the base resin were heated with 0.20 gram of cobaltous acetate tetrahydrate for 20 minutes at 160–163° C. The following ingredients were added and the charge was passed through the roller mill.

50.0 grams (additional) of base resin (untreated)
7.4 grams of 2-amino-2-methyl-1-propanol
200 ml. of distilled water
56.8 grams 3X talc
53.2 grams $TiO_2$ 2.0 ml. 24% lead naphthenate drier and 1.0 ml. 6% cobalt naphthenate drier were added and the charge was thinned with 92 ml. distilled water. (The cobalt level here is twice that normally used in solvent type paint.) (The lead is at the same level as that used in conventional coatings.) The product was not quite at the fineness of grind desired so it was ball-milled overnight.

B. HIGH GLOSS INTERIOR PAINT 50.0 grams of the base resin were heated with 0.20 gram of cobaltous acetate for 15 minutes at 160–161° C. and were then blended with 50.0 grams of the base resin at 75° C. The following ingredients were added and the charge was passed through the roller mill twice.

7.40 grams 2-amino-2-methyl-1-propanol
180 ml. distilled water
100 grams TiO$_2$
2.0 grams lead drier
1.0 gram cobalt drier This mixture was subsequently thinned with 100 ml. distilled water to improve the grind, the charge was ball-milled overnight.

C. SEMI-GLOSS INTERIOR PAINT 50.0 grams of the base resin were heated at 160–163° C. for 15 minutes with 0.20 gram cobaltous acetate. The charge was cooled to 75° C. and 50.0 grams additional base resin were added. The following ingredients were added and the charge was ball-milled overnight.

7.40 grams 2-amino-2-methyl-1-propanol
350 ml. distilled water
110 grams TiO$_2$
2.0 grams lead drier
1.0 gram cobalt drier
5.0 ml. Imperse green

D. FLAT INTERIOR WALL PAINT 35.0 grams of the base resin were heated for 15 minutes at 158–162° C. with 0.15 gram cobaltous acetate. This mixture was blended with 35.0 grams of the base resin at 100° C. The following ingredients were added with stirring and the charge was ball-milled overnight.

5.20 grams 2-amino-2-methyl-1-propanol
150 ml. distilled water
2.4 grams Thixcin
2.4 grams soya lecithin
120 grams TiO$_2$
30.0 grams Celite
300 grams Lesamite
0.70 gram cobalt drier
1.40 grams lead drier
34 ml. distilled water (to thin the charge)

COMMENTS ON COATING FROM EXAMPLE 3 PAINTS

All of the above titles describe the paints with respect to the gloss levels attained. The exterior house paint had a dull gloss. Levelling and brushing characteristics of all these paints are excellent.

These paints may themselves serve as their own primers or may be applied over conventional primers and paints with no difficulty. Coverage is good. Thus complete coverage is obtained with one coat over the primer coat.

Formulations A, B, and C dry tack-free in 2–2½ hours and are dried hard to the finger and thumb test in 4–8 hours. Through drying takes 7–12 hours. The paints have been tested on pine, fir, redwood, glass, tinplate, and sheet steel with similar drying schedules. Formulation D is tack-free within 20 minutes and through dried within 8 hours.

All formulations withstand ten finger rubs in the presence of water after 24 hours drying with no noticeable effects on the coating. After 24 hours drying formulation D showed no loss of adhesion or change in appearance after being immersed in water for 4 hours at room temperature. There was some softening of the film but a good measure of recovery was evident even 5 minutes after removal from the water and drying. After 24 hours drying, a coating of Formula A showed no removal or loss of adhesion or gloss when the full force of the cold water from the faucet was allowed to run over it for 20 minutes. Similar results were obtained with a panel coated with Formula B which had dried for 4 days.

Thus having described the invention, what is claimed is:

1. An aqueous film forming composition consisting essentially of a resinous material suitable for the formation of an air-dry surface coating film which resinous material consists essentially of (A) the polycondensation reaction product of (I) an acidic member selected from the class consisting of trimellitic acid, trimellitic anhydride, hemimellitic acid and hemimellitic anhydride and a polyalkylene glycol monoalkyl ether containing from 2 to 8 ether groups, each alkylene unit containing from 2 to 3 carbon atoms and the alkyl group containing from 1 to 8 carbon atoms, said acidic member and said ether being present in the respective mole ratio of 1:0.3–0.7 with (II) a material affording on the average of about two hydroxy groups per molecule which material is selected from the group consisting of (a) the hydroxyl group containing ester of a polyethenoid fatty acid containing at least about 10 carbon atoms and a polyhydric paraffinic alcohol containing 3–4 hydroxyl groups, (b) the alcoholysis product of a drying fatty oil and a polyhydric paraffinic alcohol containing 3–4 hydroxyl groups and (c) mixtures thereof, said material being charged in a mole ratio to acidic member charged of 1.6–2.3:1, which resin is characterized by an acid number of about 15–60 and obtaining said resinous material by heating said resin and a minor amount of a cobalt salt of a fatty acid at a temperature of 130°–220° C. for a time such that the air-dry properties of said resin are improved, said resinous material being reacted with (B) an aqueous solution of an alkaline agent selected from the group consisting of ammonia, alkylamines, heteroamines and alkanolamines to obtain an aqueous solution of said resinous material, which solution is characterized by a pH of 5 to 8 and is capable of laying down surface coating films having air-dry properties when exposed to the atmosphere at ordinary temperatures.

2. The resin of claim 1 wherein said acidic member is trimellitic anhydride.

3. The resin of claim 1 wherein said ether is diethylene glycol monobutyl ether.

4. The resin of claim 1 wherein said material is the monoglyceride of linseed oil fatty acids.

5. The resin of claim 1 wherein said material is the alcoholysis product of linseed oil and glycerol.

6. The resin of claim 1 wherein said salt is cobaltous acetate.

7. The resin of claim 1 wherein said salt is charged in an amount of 0.05–0.5 weight percent, as cobalt metal, based on said resin.

8. An aqueous film forming composition consisting essentially of a resinous material having air-dry properties when formed into a surface coating film, which resinous material consists essentially of the polycondensation reaction product of (A) an acidic member selected from the class consisting of trimellitic acid, trimellitic anhydride, hemimellitic acid and hemimellitic anhydride and a polyalkylene glycol monoalkyl ether containing from 2 to 8 ether groups, each alkylene unit containing from 2 to 3 carbon atoms and the alkyl group containing from 1 to 8 carbon atoms, said acidic member and said ether being present in the respective mole ratio of 1:0.3–0.7 and a polyethenoid fatty alcohol containing at least 6 carbon atoms, said acidic member and said fatty alcohol being present in the respective mole ratio of 1:0.7–0.3, and the mole ratio of said acid member to the sum of the ether and fatty alcohol charged being about 1:1, with (B) a material affording on the average of about two hydroxyl groups per molecule which material is selected from the group consisting of (a) the hydroxyl group containing ester of a polyethenoid fatty acid containing at least about 10 carbon atoms and a polyhydric paraffinic alcohol containing 3–4 hydroxyl, (b) the alcoholysis product of a drying fatty oil and a polyhydric paraffinic alcohol containing 3–4 hydroxyl groups and (c) mixtures thereof, said material being charged in a mole ratio to acidic member charged of 1.6–2.3:1, which resin is characterized by an acid number of about 15–60 and obtaining said resinous material by heating said resin and about 0.05–0.5 weight percent, as cobalt metal based on said resin, of a cobalt salt of a fatty acid at a temperature of 130°–220° C. for a time such that the air-dry properties of said resin are improved, said resinous material being reacted with an aqueous solution of an alkaline agent selected from the group consisting of ammonia, alkylamines, heteroamines and alkanolamines to obtain an aqueous solution of resinous material, which solution is characterized by a pH of 5 to 8 and is capable of laying down films having air drying properties when exposed to the atmosphere at ordinary temperatures.

9. The resin of claim 8 wherein said fatty alcohol is linseed fatty alcohol.

References Cited in the file of this patent

UNITED STATES PATENTS

| | | |
|---|---|---|
| 2,019,510 | Sorenson | Nov. 5, 1935 |
| 2,134,429 | Brown | Oct. 25, 1938 |
| 2,319,575 | Agens | May 18, 1943 |
| 2,870,102 | Van Strien | Jan. 20, 1959 |
| 2,910,455 | Christenson et al. | Oct. 27, 1959 |

FOREIGN PATENTS

| | | |
|---|---|---|
| 23,291/29 | Australia | Oct. 30, 1929 |
| 1,074,263 | Germany | Jan. 28, 1960 |

UNITED STATES PATENT OFFICE
CERTIFICATE OF CORRECTION

Patent No. 3,120,499                            February 4, 1964

Ronald L. Broadhead

It is hereby certified that error appears in the above numbered patent requiring correction and that the said Letters Patent should read as corrected below.

Column 6, lines 29 and 30, for "coat. The film from paint A was tacky (untreated resin; hours." read -- coat was tack-free in 2 hours and dried throughout in 5 hours. --; line 67, for "paint" read -- paints --; column 8, line 66, after "hydroxyl" insert -- groups --.

Signed and sealed this 23rd day of June 1964.

(SEAL)
Attest:

ERNEST W. SWIDER
Attesting Officer

EDWARD J. BRENNER
Commissioner of Patents